US009329962B2

(12) United States Patent
Salame

(10) Patent No.: US 9,329,962 B2
(45) Date of Patent: May 3, 2016

(54) SYSTEM AND METHODS FOR AUTOMATED TESTING OF FUNCTIONALLY COMPLEX SYSTEMS

(71) Applicant: TrueMetrics LLC, Atherton, CA (US)

(72) Inventor: Mansour Anthony Salame, Atherton, CA (US)

(73) Assignee: TRUEMETRICS LLC, Atherton, CA (US)

( * ) Notice: Subject to any disclaimer, the term of this patent is extended or adjusted under 35 U.S.C. 154(b) by 0 days.

(21) Appl. No.: 14/666,286

(22) Filed: Mar. 23, 2015

(65) Prior Publication Data

US 2015/0309906 A1  Oct. 29, 2015

Related U.S. Application Data

(63) Continuation of application No. 13/829,823, filed on Mar. 14, 2013, now Pat. No. 8,990,629, which is a continuation of application No. 13/485,639, filed on May 31, 2012, now Pat. No. 8,418,000.

(60) Provisional application No. 61/610,201, filed on Mar. 13, 2012.

(51) Int. Cl.
*G06F 11/00* (2006.01)
*G06F 11/263* (2006.01)
*G06F 11/36* (2006.01)
*G06F 11/07* (2006.01)
*H04L 29/08* (2006.01)

(52) U.S. Cl.
CPC .......... *G06F 11/263* (2013.01); *G06F 11/0709* (2013.01); *G06F 11/079* (2013.01); *G06F 11/3664* (2013.01); *G06F 11/3688* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,701,460 B1 * | 3/2004 | Suwandi | ............. | G06F 11/2215 714/38.1 |
| 2003/0172321 A1 * | 9/2003 | Wolin | ................. | G06F 11/2215 714/41 |
| 2005/0015702 A1 * | 1/2005 | Shier | .................... | G06F 11/2273 714/776 |

* cited by examiner

*Primary Examiner* — Yolanda L Wilson

(74) *Attorney, Agent, or Firm* — Galvin Patent Law LLC; Brian R. Galvin

(57) ABSTRACT

A system for automated testing of functionally complex systems prior to placing them into production, comprising a test manager module operating on a server computer, a test data storage subsystem coupled to the test manager module and adapted to store at least test results, a test execution module operating on a server computer, and a test analysis module operating on a server computer and adapted to receive test data from the test data storage subsystem. The test manager module causes tests to be executed by the test execution engine, and on detection of an anomalous test result, the test manager module at least causes additional testing to be performed and causes the test analysis module to analyze the results of at least some of the additional testing in order to isolate at least one component exhibiting anomalous behavior.

7 Claims, 10 Drawing Sheets

SYSTEM AND METHODS FOR AUTOMATED TESTING OF FUNCTIONALLY COMPLEX SYSTEMS

CROSS-REFERENCE TO RELATED APPLICATIONS

This application is a continuation of U.S. patent application Ser. No. 13/829,823, titled "SYSTEM AND METHODS FOR AUTOMATED TESTING OF FUNCTIONALLY COMPLEX SYSTEMS," filed on Mar. 14, 2013, which is a continuation of U.S. patent application Ser. No. 13/485,639, titled "SYSTEM AND METHODS FOR AUTOMATED TESTING OF FUNCTIONALLY COMPLEX SYSTEMS," filed on May 31, 2012, which claims priority to U.S. provisional patent application Ser. No. 61/610,201, titled "SYSTEM AND METHODS FOR AUTOMATED TESTING OF FUNCTIONALLY COMPLEX SYSTEMS", filed on Mar. 13, 2012. The disclosure of each of the above-referenced patent applications is hereby incorporated by reference in its entirety.

BACKGROUND OF THE INVENTION

1. Field of the Invention

The invention relates to the field of automated testing, and particularly to the field of automated testing of functionally complex systems such as communication environments.

2. Discussion of the State of the Art

Testing of functionally complex systems typically involves set of activities such as test planning, system analysis, creation of test cases, execution of test cycles, and final testing. Particularly in the field of software testing, testing activities typically occur before a system is implemented into a target environment. The goal of system testing is to determine if a system meets the requirements that guided its design and development, works as expected, and can be implemented in a target environment with the desired functionality. More often than not, after a system is tested and put into a target environment, the system does not, again, undergo a complete functional test to ensure continued system stability. Instead, any future testing typically focuses on individual system components or functional segments that have caused a fault or are in the process of being upgraded.

Many commercial software applications have become large and extremely complex, and in turn, their inherit complexity has adversely impacted the testing process. In these cases, a functionally complex system that is not sufficiently tested often behaves differently in the target environment than in the test environment, resulting in unexpected performance, and complex systems as a result often do not meet the stated objectives. Furthermore, system failures can often occur as a result of failures that were undetected during insufficient testing, causing a partial or total loss of service. In a business setting, this situation often has a financial impact to the business in that it can decrease revenues (for example, resulting from a loss of service to customers, and thus lost sales or sales opportunity), increase expenses (for example, time and cost spent to repair the fault in the system), and adversely affect customer service (for example, by not providing a robust and professional service to customers).

In order to predict the expected behavior of functionally complex systems, a more complete, robust, and continuous testing scenario is needed for systems that are functionally complex. As such, in a business environment, a system that operates as expected can be used to commercial advantage by enabling a business to always have service available to customers, avoid lost customers, and increase a business' confidence in knowing that their system can handle variable conditions whilst maintaining integrity and up-time in the operating environment.

SUMMARY OF THE INVENTION

Accordingly, the inventor has conceived and reduced to practice, in a preferred embodiment of the invention, a system for automated testing of functionally complex systems.

According to a preferred embodiment of the invention, a system for automated testing of functionally complex systems, comprising a test manager module operating on a server computer, a test data storage subsystem coupled to the test manager module and adapted to store at least test results, a test execution module operating on a server computer, and a test analysis module operating on a server computer and adapted to receive test data from the test data storage subsystem, is disclosed. According to the embodiment, the test manager module causes tests to be executed by the test execution engine, and on detection of an anomalous test result, the test manager module at least causes additional testing to be performed and causes the test analysis module to analyze the results of at least some of the additional testing in order to isolate at least one component exhibiting anomalous behavior.

According to another embodiment of the invention, the system further comprises a log collection module operating on a server computer and adapted to receive log data from a plurality of log collectors. According to the embodiment, the test analysis module analyzes collected log data at least to assess test outcomes.

According to a further embodiment of the invention, the system further comprises an event collection module operating on a server computer and adapted to receive event data from a plurality of event collectors. According to the embodiment, the test analysis module analyzes collected event data at least to assess test outcomes.

According to yet another embodiment of the invention, the test analysis module further comprises a correlation engine, and the correlation engine performs at least a correlation analysis of a plurality of test or operating data obtained from one or more of the test execution module, the log collection module, and the event collection module.

According to yet another embodiment of the invention, the correlation analysis is used to identify a plurality of components of a tested system tested likely to have contributed to a test failure. According to a further embodiment of the invention, the correlation analysis is used to identify at least one precursor pattern, the precursor pattern comprising a plurality of event or log data elements occurring previous to a failed test.

According to a further embodiment of the invention, the event collection module or the test analysis module identifies an occurrence of a previously detected precursor pattern. In yet another embodiment, based at least in part on the occurrence of a previously detected precursor pattern, an alert is sent to a user of the system tested. In a further embodiment, based at least in part on the occurrence of a previously detected precursor pattern, an automated action is taken to avoid an impending fault.

According to an embodiment of the invention, a system according to the invention is operated as a cloud-based service that provides automated testing to a plurality of operators of functionally complex systems located substantially remotely from the cloud-based service. In a further embodiment of the invention, a system according to the invention is operated as a cloud-based service that provides automated testing to a plurality of operators of functionally complex systems located substantially remotely from the cloud-based service.

According to a preferred embodiment of the invention, a method for automated testing of functionally complex systems is disclosed, comprising the steps of: (a) periodically testing a plurality of components of a functionally complex system; (b) logging results of periodic testing; (c) upon detection of a fault, sending an alert based on the detected fault; (d) upon detection of a fault, conducting a plurality of additional tests in order to isolate one or more components responsible for the fault; and (e) if one or more components responsible for the fault are identified, sending an alert at least identifying the identified components.

According to further embodiment of the invention, the method further comprises the steps of: (d1) determining if automated fault correction is possible; and (d2) if automated fault correction is possible, automatically correcting the fault.

According to yet a further embodiment of the invention, the method further comprising the steps of: (f) conducting post-fault analysis using a correlation engine to determine whether a precursor event pattern exists for the fault; and (g) if so, adding the determined precursor event pattern to a test data storage subsystem.

According to another embodiment of the invention, the steps (a) through (e) above are carried out using a cloud-based testing platform, and the functionally complex system to be tested is operated by an entity different from the entity that operates the cloud-based testing platform, and is located remotely from the cloud-based testing platform.

According to another embodiment of the invention, the steps (a) through (g) above are carried out using a cloud-based testing platform, and the functionally complex system to be tested is operated by an entity different from the entity that operates the cloud-based testing platform, and is located remotely from the cloud-based testing platform.

According to a preferred embodiment of the invention, a method for proactively preventing faults in a functionally complex system is disclosed, the method comprising the steps of: (a) monitoring, using a log collection module, an event collection module, or both, a plurality of components of a functionally complex system, wherein the monitoring is pre-configured to detect a plurality of previously-identified precursor event patterns indicative of an incipient fault in one or more of the components; and (b) upon detection of a precursor event pattern, sending an alert based on the detected precursor event pattern. According to a further embodiment of the invention, the method further comprises the steps of: (c) determining if automated fault correction is possible; and (d) if automated fault correction is possible, automatically correcting the fault.

According to another embodiment of the invention, the steps (a) through (d) above are carried out using a cloud-based testing platform, and the functionally complex system to be tested is operated by an entity different from the entity that operates the cloud-based testing platform, and is located remotely from the cloud-based testing platform.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
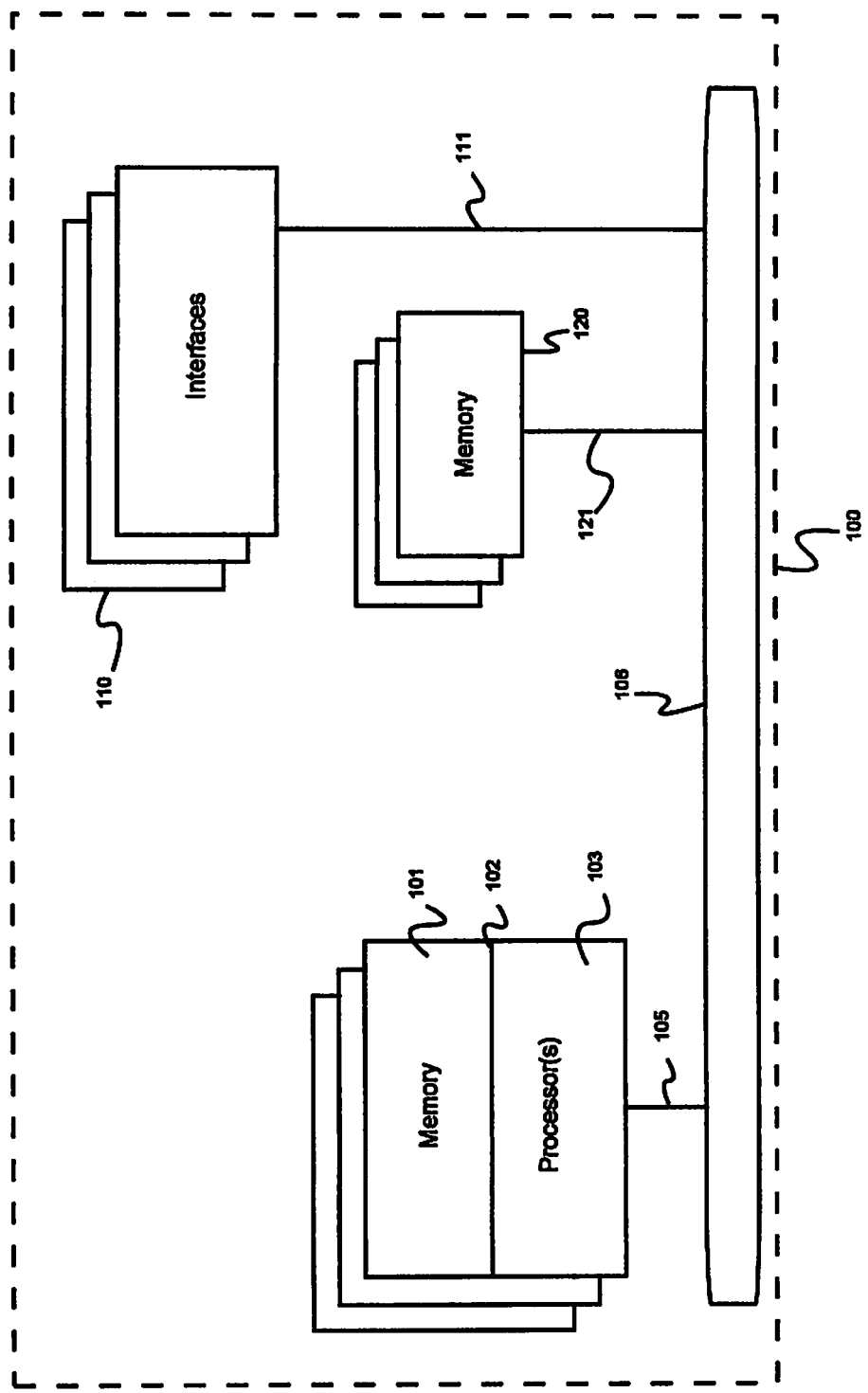
FIG. 1 is a block diagram illustrating an exemplary hardware architecture of a computing device used in an embodiment of the invention.

The inventor has conceived, and reduced to practice, a system and various methods for automatically testing systems that exhibit a high level of functional complexity that address the shortcomings of the prior art that were discussed in the background section.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Furthermore, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of the embodiments of the present invention in which for example functions may be executed out of order from that shown or discussed, including substantially concurrently or in reverse order, depending on the functionality involved, as would be understood by those having ordinary skill in the art.

DEFINITIONS

A system is "functionally complex" when it is composed of interconnected parts in intricate arrangement where there is a degree of difficulty in predicting the properties, behavior, and function of the system in an environment.

A "system test" of software or hardware is testing conducted on a system to evaluate its compliance and ability to execute within specified parameters.

A system is put into "production" after testing, when it handles "real world" data and loads. For example, in a contact center system deployment project, testing is usually done in at least one test environment (sometimes more, such as development test, system test, integration test, and user acceptance test, environments), prior to placing the system into operation with "live" calls from real customers (that is, prior to placing the system in production).

A "virtual machine" is a (generally) software-based module which behaves, with respect to other systems, as if it were a separate computer, but which usually resides on a general-purpose server that hosts a plurality of virtual machines (sometimes hundreds). Virtual machines generally have at least one distinct network address, and they maintain their own file systems (although it should be noted that generally a virtual machine is actually stored on the host machine as a single complex data file on the host server's file system).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Software/hardware hybrid implementation(s) of at least some of the embodiment(s) disclosed herein may be implemented on a programmable machine selectively activated or reconfigured by a computer program stored in memory. Such network devices may have multiple network interfaces that may be configured or designed to utilize different types of network communication protocols. A general architecture for some of these machines may appear from the descriptions disclosed herein. According to specific embodiments, at least some of the features and/or functionalities of the various embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, music player, or any other suitable electronic device, router, switch, or the like, or any combination thereof. In at least some embodiments, at least some of the features and/or functionalities of the various embodiments disclosed herein may be implemented in one or more virtualized computing environments (e.g., network computing clouds, virtual machine clusters, or the like).

Referring now to FIG. 1, there is shown a block diagram depicting a computing device 100 suitable for implementing at least a portion of the features and/or functionalities disclosed herein. Computing device 100 may be, for example, an end-user computer system, network server or server system, mobile computing device (e.g., tablet device, mobile phone, smartphone, laptop, tablet computer, or the like), consumer electronic device, music player, or any other suitable electronic device, or any combination or portion thereof. Computing device 100 may be adapted to communicate with other computing devices, such as clients and/or servers, over a communications network such as the Internet, using known protocols for such communication, whether wireless or wired.

In one embodiment, computing device 100 includes central processing unit (CPU) 102, interfaces 110, and a bus 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as an automated testing component utilizing CPU 102, memory 101, 120, and interface(s) 110. In at least one embodiment, CPU 102 may be caused to perform one or more of the different types of functions and/or operations under the control of software modules/components, which for example, may include an operating system and any appropriate applications software, drivers, and the like.

CPU 102 may include one or more processor(s) 103 such as, for example, a processor from one of the Intel, ARM, Qualcomm, and AMD families of microprocessors. In some embodiments, processor(s) 103 may include specially designed hardware (e.g., application-specific integrated circuits (ASICs), electrically erasable programmable read-only memories (EEPROMs), field-programmable gate arrays (FPGAs), and the like) for controlling operations of computing device 100. In a specific embodiment, a memory 101 (such as non-volatile random access memory (RAM) and/or read-only memory (ROM)) also forms part of CPU 102. However, there are many different ways in which memory may be coupled to the system. Memory block 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as interface cards (sometimes referred to as "line cards"). Generally, they control the sending and receiving of data packets over a computing network and sometimes support other peripherals used with computing device 100. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing the techniques of the invention(s) described herein, it is by no means the only device architecture on which at least a portion of the features and techniques described herein may be implemented. For example, architectures having one or any number of processors 103 can be used, and such processors 103 can be present in a single device or distributed among any number of devices. In one embodiment, a single processor 103 handles communications as well as test management tasks. In various embodiments, different types of features and/or functionalities may be implemented in a system according to the invention that includes a client device (such as a tablet device or smartphone running client software) and server system(s) (such as a server system described in more detail below).

Regardless of network device configuration, the system of the present invention may employ one or more memories or memory modules (such as, for example, memory block 120) configured to store data, program instructions for the general-purpose network operations and/or other information relating to the functionality of the embodiments described herein. The program instructions may control the operation of an operating system and/or one or more applications, for example. The memory or memories may also be configured to store data structures, complex system configuration information, historical data pertaining to system performance, information pertaining to user actions taken as a result of or in addition to automated testing, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both machine code, such as produced by a compiler, and files containing higher level code that may be executed by the computer using an interpreter.

Figure 2:
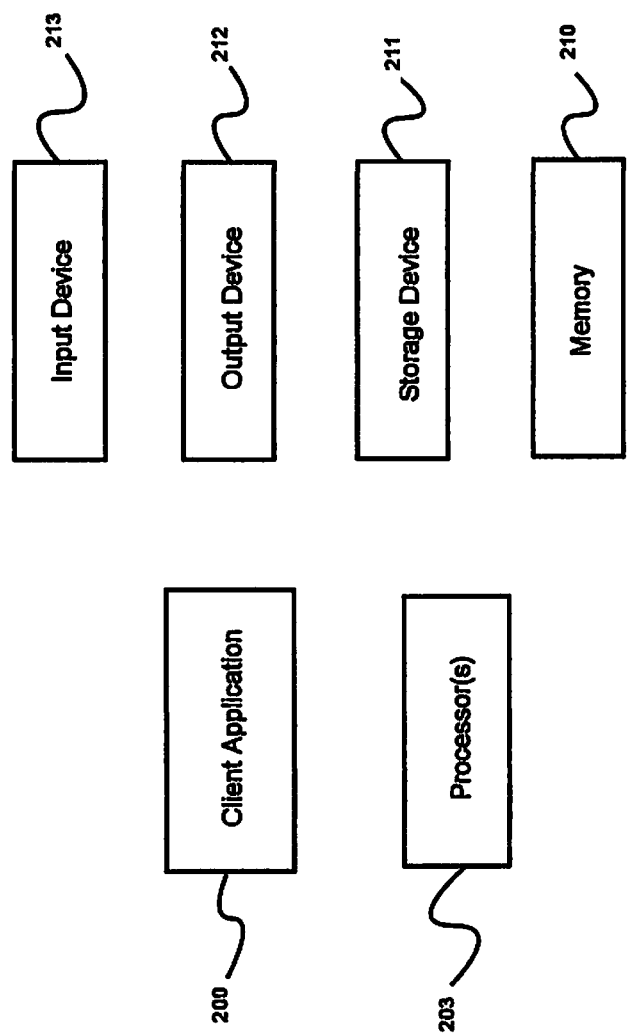
FIG. 2 is a block diagram illustrating an exemplary logical architecture for a client device, according to an embodiment of the invention.

In some embodiments, systems used according to the present invention may be implemented on a standalone computing system. Referring now to FIG. 2, there is shown a block diagram depicting an exemplary architecture for implementing one or more embodiments or components thereof on a standalone computing system. Computing device 100 includes processor(s) 103 that run software for implementing for example a testing client application 200. Input device 212 can be of any type suitable for receiving user input, including for example a keyboard, touchscreen, microphone (for example, for voice input), mouse, touchpad, trackball, five-way switch, joy stick, and/or any combination thereof. Output device 1711 can be a screen, speaker, printer, and/or any combination thereof. Memory 210 can be random-access memory having a structure and architecture as are known in the art, for use by processor(s) 103 for example to run software. Storage device 211 can be any magnetic, optical, and/or electrical storage device for storage of data in digital form; examples include flash memory, magnetic hard drive, CD-ROM, and/or the like.

Figure 3:
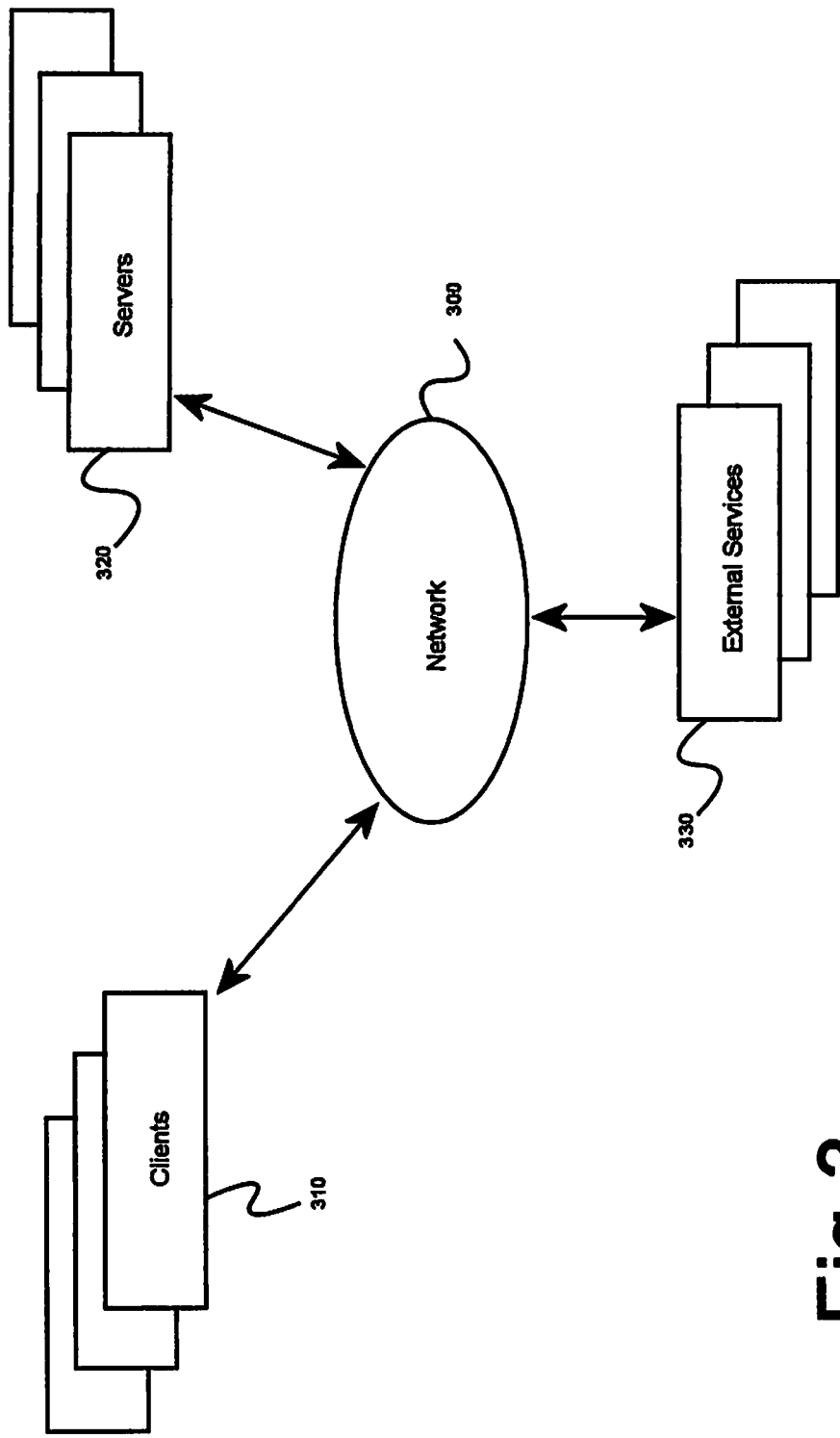
FIG. 3 is a block diagram showing an exemplary architectural arrangement of clients, servers, and external services, according to an embodiment of the invention.

In some embodiments, the system of the present invention is implemented on a distributed computing network, such as one having any number of clients and/or servers. Referring now to FIG. 3, there is shown a block diagram depicting an architecture for implementing at least a portion of a system for automated testing on a distributed computing network, according to at least one embodiment.

The arrangement shown in FIG. 3, any number of clients 310 may be provided; each client 310 may run software for implementing client-side portions of the present invention. In addition, any number of servers 320 can be provided for handling requests received from clients 310. Clients 310 and servers 320 can communicate with one another via electronic network 300, which may be in various embodiments any of the Internet, a wide area network, a mobile telephony network, a wireless network (such as WiFi, Wimax, and so forth), or a local area network (or indeed any network topology known in the art; the invention does not prefer any one network topology over any others). Network 300 may be implemented using any known network protocols, including for example wired and/or wireless protocols.

In addition, in some embodiments, servers 320 can call external services 330 when needed to obtain additional information, or to refer to additional data concerning a particular call. Communications with external services 330 can take place, for example, via network 300. In various embodiments, external services 330 include web-enabled services and/or functionality related to or installed on the hardware device itself. For example, in an embodiment where client 200 is implemented on a smartphone or other electronic device, client 200 can obtain information stored on various systems to be tested or in databases resident in the cloud or on an external service 230 deployed on one or more of a particular enterprise's or user's premises.

In various embodiments, functionality for implementing the techniques of the present invention can be distributed among any number of client and/or server components. For example, various software modules can be implemented for performing various functions in connection with the present invention, and such modules can be variously implemented to run on server and/or client components.

Conceptual Architecture

Figure 4:
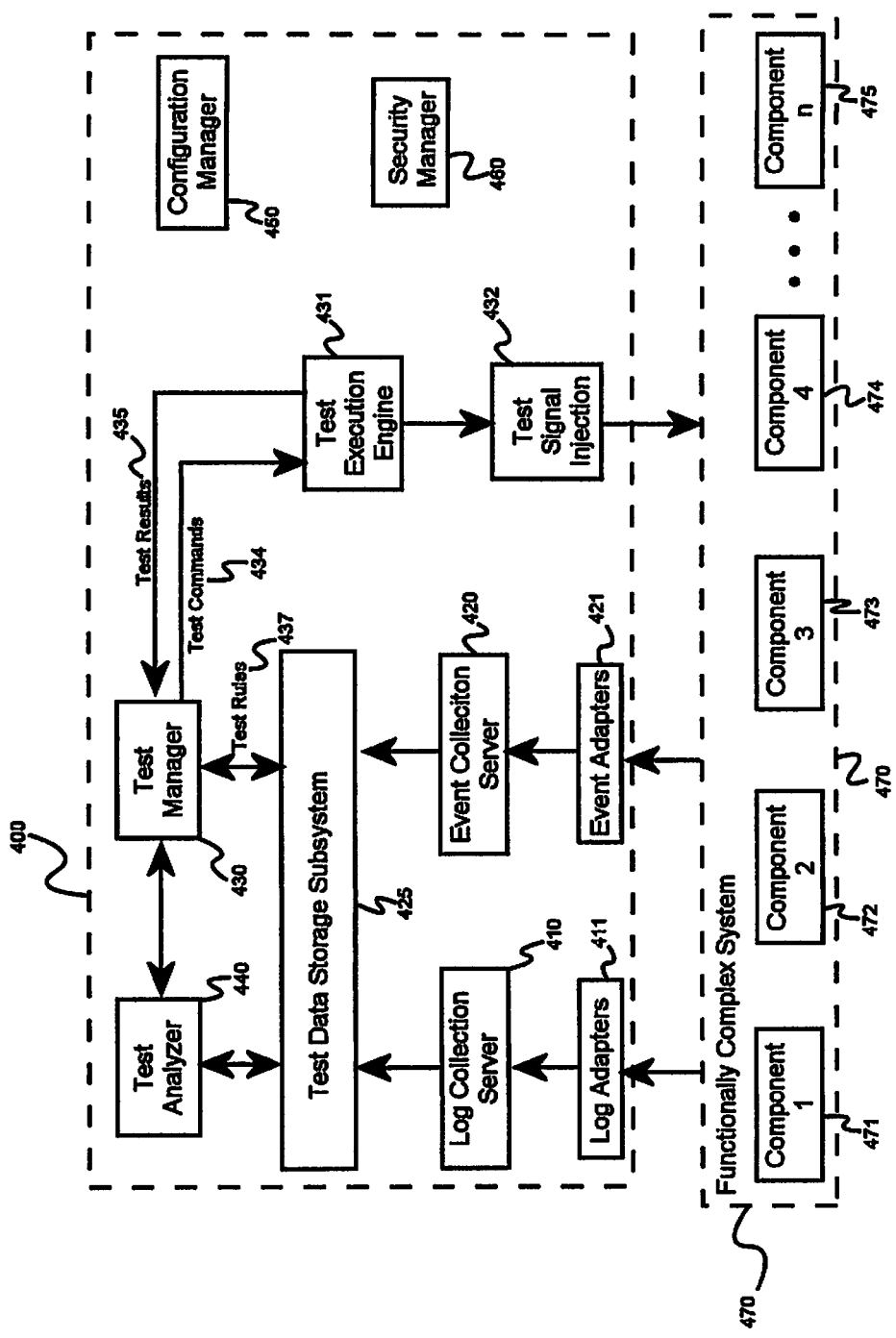
FIG. 4 is a block diagram of a preferred embodiment of the invention, illustrating conceptual architecture elements pertaining to the invention.

FIG. 4 provides a high-level diagram of a system 400 according to a preferred embodiment of the invention, which will be useful for discussing aspects of the invention and improvements provided by the invention over systems known in the art. According to the embodiment, a functionally complex system 470 is comprised of a plurality of components 471-475, which typically interact with each other in a functionally complex way. For example, when functionally complex system 470 is a contact center, component 1 471 might be an automated call distribution system (ACD), component 2 472 might be a computer-telephony integration (CTI) server, component 3 473 might be a call routing server, component 4 474 might be a statistics server, and so forth. Not all components 471-475 of functionally complex system 470 are necessarily located in one place or operated by one entity; for example, component n 475 might be a separate, cloud-based customer relationship management (CRM) system. What is shared by components 471-475 is a common membership in complex system 470, which implies that a plurality of components 471-475 work together to achieve some end desired by an owner or operator of complex system 470; for example, if system 470 is a contact center, the end might be the efficient delivery of customer-satisfying service interactions.

When a functionally complex system 470 operates, it is often difficult to detect and ameliorate failures in one or more of components 471-475, and frequently significant system inefficiencies result from undetected or uncorrected faults. It is therefore a primary objective of the invention to provide a system 400 for testing functionally complex systems 470, and in some embodiments such a system 400 carries out its functions from locations remote from complex system 470, as for example by testing services being delivered by test system 400 as a cloud-based service on behalf of a plurality of customers (each customer typically being an owner or operator of its own functionally complex system 470). A key goal of test system 400 is to be able to detect failures in complex system 470, to characterize such failures as for example by automatically conducting root causes analyses of failures, and to mitigate or correct such failures—ideally doing so before any end user of system 470 is aware of, or reports, any degradation stemming from the failure in system 470. In some embodiments where test system 400 is operated as a cloud-based service, the operator of test system 400 may detect a problem in one or more components associated with a particular client's (of the cloud-based testing system 400) production system. While such an operator will generally alert the client and conduct automated test follow-up as described below, in some embodiments the operator will also analyze configurations of systems being operated (and tested) by other clients to identify other clients that may be susceptible to a similar fault pattern. For instance, if a particular type of network data router exhibited a load-related problem in a certain configuration, system 400's operator would automatically determine if any other clients used the same or a similar network router, particularly in the same configuration. On detecting such a potential fault situation, the operator might notify the second client of a possible problem, or system 400 might automatically begin conducting more thorough testing of the suspect component belonging to the second client, in order to proactively detect an incipient fault and to avert it.

In a preferred embodiment of the invention, test system 400 comprises a central test manager 430, which is a software module operating on a computing device and which provides a user interface that allows users of test manager 430 to configure, start, stop, and interpret results of a wide range of automated tests that probe the behavior of one or more functionally complex systems 470. Using test manager 430, users may create, view, activate, deactivate, store, or otherwise manipulate one or more test rules 437, which are generally stored in a persistent data storage system such as test data storage subsystem 425. In general, in response to actions taken by users (or by invocation of applicable test rules 437), users may send test commands 434 to test execution engine 431, which carries out tests in accordance with either or both of test rules 437 and test commands 434. As tests are executed by test execution engine 431, test results 435 are sent back to test manager 430, where they may be viewed by users, stored in test data storage subsystem 425, or used to trigger one or more test rules 437 automatically; in this way a particular test result 435 may trigger a test rule 437 and thereby cause additional test commands 434 to be sent to test execution engine 431, allowing test system 400 to flexibly adjust test performance based on previous test results 435. In some embodiments, one or more test analyzers 440 may be provided. Test analyzers 440 may conduct automated analyses of test results 435 stored in test data subsystem 425, and users of test manager 430 may conduct ad hoc or manual analyses as desired. Test analyzers 440 may be provided which, among other possibilities, identify patterns of events or test results 435 that are indicative of incipient or ongoing faults, the patterns being useful in that future occurrences of the faults indicated may be detected earlier (potentially before any significant or even user-detectable symptoms occur), thus allowing automated response to incipient faults and generally improving reliability of complex system 470.

In some embodiments, in addition to directly obtained test results 435, it is beneficial to provide operating data pertaining to one or more components 471-475, for example to allow test analyzers 440 to conduct more thorough fault analyses by considering not only direct results, but also routinely measured operational parameters and events from system 470. To this end, in some embodiments one or more log adapters 411 are provided in or in conjunction with test system 400, log adapters 411 being capable of receiving or retrieving log file data pertaining to one or more components 471-475. It will be readily understood by one having ordinary skill in the art that "log data" may come in many forms and from many sources, any of which may be used with an appropriate log adapter 411, according to the invention. For example, log data may be obtained from log files that are simple text files stored automatically on one or more components 471-475, or log data may be obtained from special purpose log databases, as are common in the art. According to an embodiment, one or more log adapters 411 receive or retrieve operational data from one or more components 471-475 under the control of log collection server 410, which manages log data collection, for example by setting up, managing, and altering log collection processes. In general, log data, after being collected by log adapters 411 under control of log collection server 410, is stored in test data storage subsystem 425, although other arrangements are common according to various embodiments (for example, one or more separate log databases may be maintained within test system 400). In some cases, one or more components 471-475 either do not collect log file data, or do not collect complete log file data (that is, not everything that occurs in the component 471-475 is stored in a log file). Accordingly, in a preferred embodiment one or more event adapters 421 may also be provided to interface directly with components 471-475 to receive events. For example, if component 2 472 is a CTI server, an event adapter 421 is typically configured to receive CTI events in real time from CTI server 472, allowing functionally complex system 470 operations to be monitored more fully, and more synchronously (i.e., in real time). It will be appreciated by one having ordinary skill in the art that event adapters may be of many types and designs, any of which (or any combination of which) may be used according to the invention. For example, an event adapter 421 may be a client application that connects to a component 471-475 directly, using any of a variety of standard or proprietary interprocess communications means, and thereafter register to receive some or all events generated at the component 471-475. In a fashion analogous to that used for log file data, operations of one or more event adapters 421 may be controlled or managed by event collection server 420.

Conceptually, when test commands 434 are passed from test manager 430 to test execution engine 431, they are generally passed along to one or more test signal injection components 432, which in turn inject one or more test signals into one or more components 471-475 of system 470 in order to test the operation of system 470. Test signals may be commands, in a protocol suitable to be received and understood by the applicable component 471-475, or they may be data streams that are received by one or more components 471-475 instead of, or in addition to, operating data signals normally received by the components 471-475. For example, in one embodiment a test signal might be a call initiation command transmitted via test signal injection component.

In some embodiments, configuration manager 450 is used to configure test system 400 on how to run the tests, what components to use, and other component specific or general testing directives. Furthermore, security manager 460 is used to limit access between multiple functionally complex systems 470 to protect sensitive data or other proprietary data owned by each functionally complex system 470.

In another embodiment of the solution, functionally complex system 470 registers its components, how components are related to each other, what interfaces are used, general system environment, as well as any other characteristic information available from the system, to component and architecture registration 445. Test system 400 then saves the configuration for each functionally complex system 470 to the test storage subsystem 425. When the test system 400 operates, it uses test result information in test data storage subsystem 425 from testing various functionally complex systems 470 to proactively identify issues in another functionally complex system 470 of a similar architecture or having similar components.

DETAILED DESCRIPTION OF EXEMPLARY EMBODIMENTS

Figure 5:
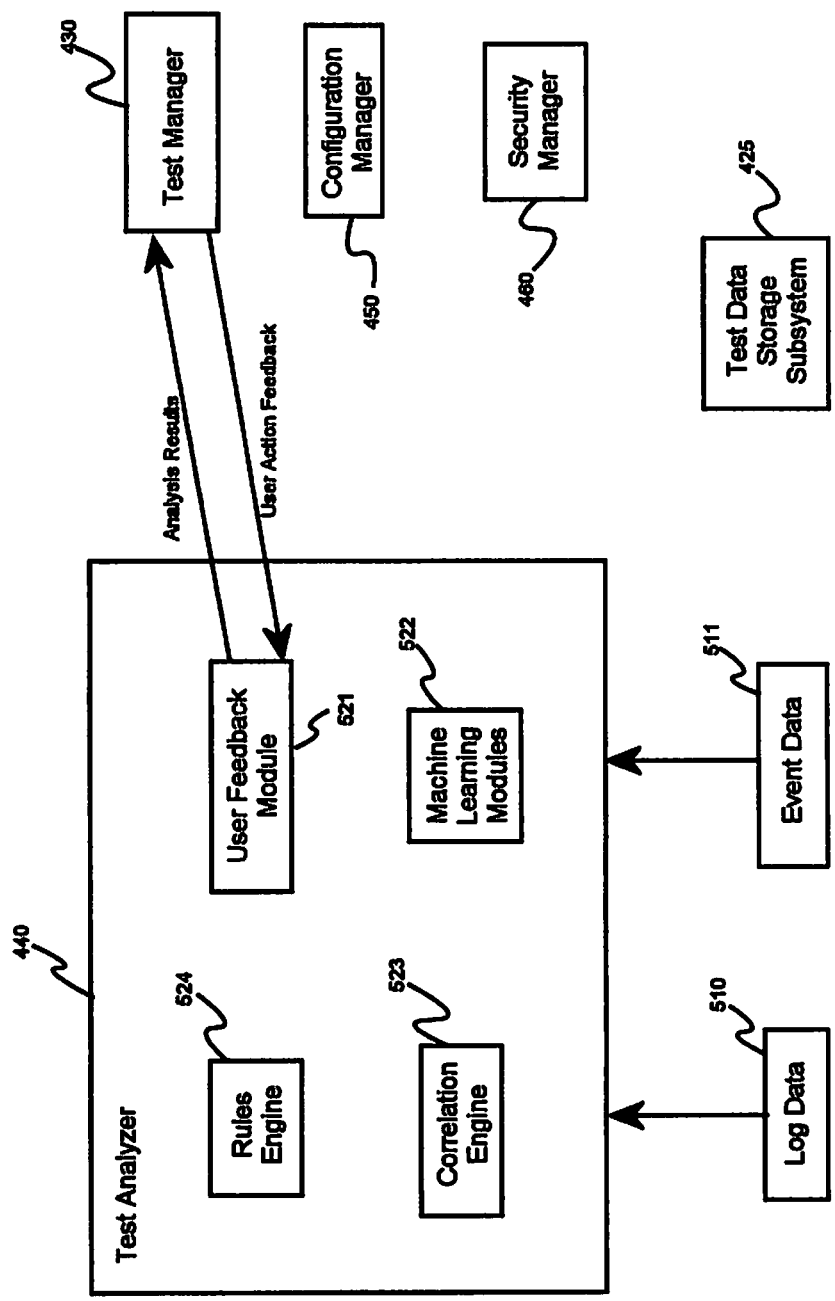
FIG. 5 is a block diagram showing details of a test analyzer component, according to a preferred embodiment of the invention.

FIG. 5 is a block diagram showing details of a test analyzer component 440, according to a preferred embodiment of the invention. According to one embodiment, test analyzer 440 may be comprised of four main components.

Rules engine 524 defines rules that may be used during testing of functionally complex system 470. For example, a rule could specify that if a certain component indicates a fault has occurred, then a series of specific follow-up tests will be executed to further characterize the detected fault. In another example, if a fault occurs in a routine end-to-end test of a complex process, a rule may specify that a series of different tests will be performed to attempt to isolate one or more specific components that may be responsible for causing the detected fault. It will be appreciated by one having ordinary skill in the art that there are many rules engines known in the art, and many rule definition protocols or techniques, which typically support rules, facts, priority, exclusions, preconditions, and/or other functions that may be used to trigger rules and take actions based on incidents occurring in complex systems, any of which may be used in any combination in the invention.

User feedback module 521 reports information with respect to testing, to test manager 430 so that a user can evaluate a current state of testing environment 400 (for example, by providing a series of test results optionally with one or more confidence ratings, by alerting to a fault that was detected through periodic testing, or by providing other information useful to test manager 440 in a testing environment 400).

Machine learning module 522 generates actionable recommendations based on automated analysis of components in functionally complex system 470 testing environment (for example, a module that learns component layouts, architectures, and components that may be potentially faulty based on external information, or on information that is discovered, for example, during execution of testing).

Correlation engine 523 performs analyses of a plurality or series of tests, for example by conducting an analysis of test performance across a plurality of different communication paths (for example, identifying paths that have had a successful outcome in testing, and thus discarding them for uncovering faults), quantitative and time-based characteristics (for example, input/output rates for various hardware and software, identifying and correlating when errors occur, etc.), and coordinating different informational sources, such as data retrieved from log data 510 (for example, time-coded log information from all the devices within functionally complex system 470 that generate a log) and/or event data 511 (for example, a notification resulting from a user's pressing a specific key on a keyboard, from a hardware device such as a timer, or from components either within or external to a functionally complex system 470), that may change one or more behaviors of system 470 in response to such detected events or log results pertaining to functionally complex system 470.

Referring again to FIG. 5, test data storage subsystem 425 is a volatile or a persistent data storage system that holds information pertaining to configuration of tests, test results, analyses performed in response to tests, and so forth. Configuration manager 450 is used to configure test system 400 as described previously. Security manager 460 is used to limit access by users within or between a plurality functionally complex systems 470 and test system 400, as described previously.

Figure 6:
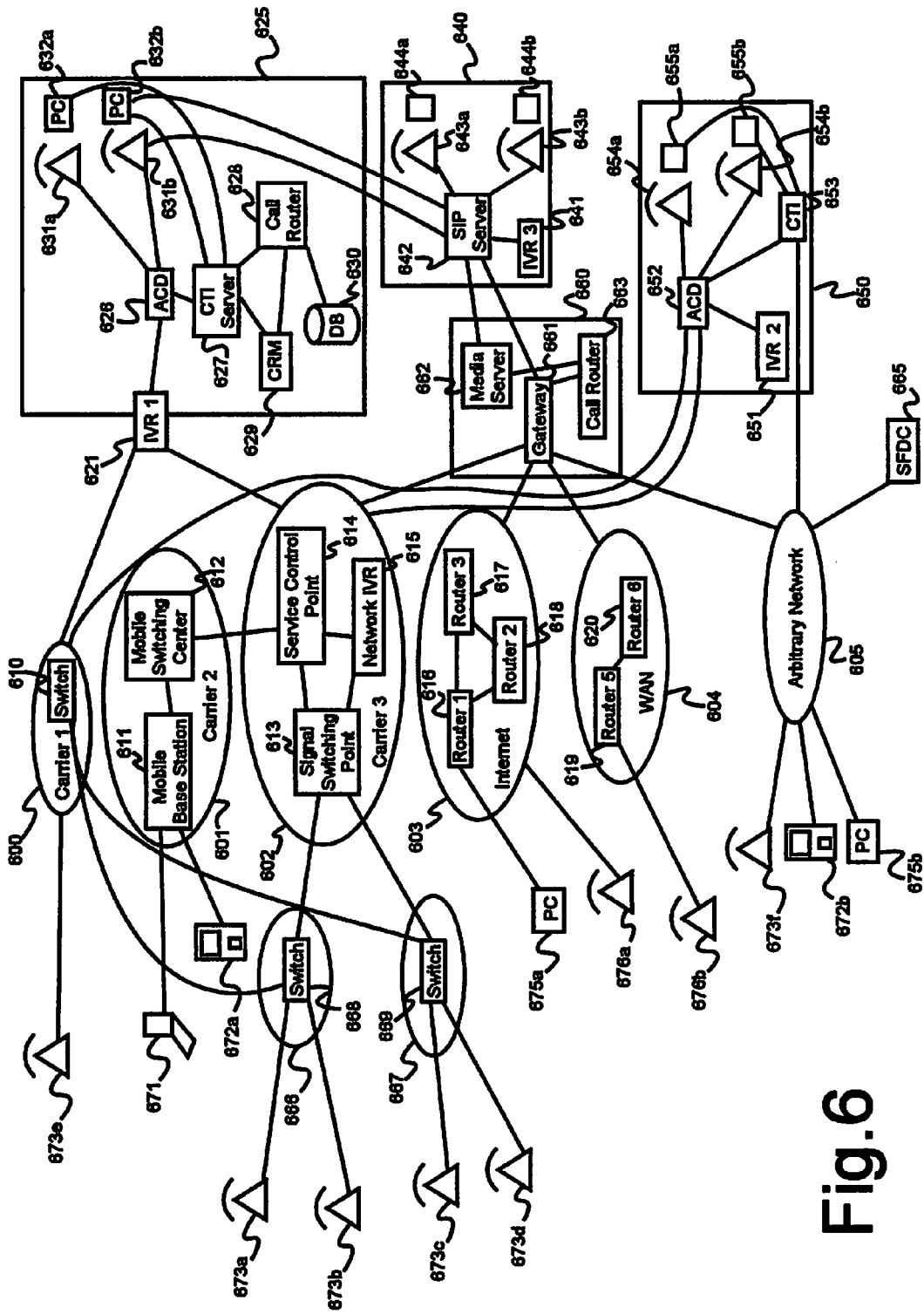
FIG. 6 is a detailed block diagram showing an exemplary functionally complex system, specifically a multisite contact center.

FIG. 6 is a detailed block diagram showing an exemplary functionally complex system, specifically a multisite contact center. According to the embodiment, FIG. 6 represents an exemplary communication environment that encompasses a multi-site customer service center, typical cloud based services, and user endpoints that are used to facilitate communication between customers and customer service contact center agents.

Carrier 1 600 is, for example, a telephony carrier comprised of a one or more telephone exchange switch 610 serving one or more plain old telephony service (POTS) telephones 673e. It will be appreciated by one having ordinary skill in the art that there are many functions typical carried out by telephone exchange switch, any of which can be used and tested in accordance with the invention. Carrier 2 601 is, for example, a mobile carrier comprising one or more mobile base stations 611 and one or more mobile switching centers 612 serving one or more consumers using various devices such as laptops 671 or mobile telephones or tablet computing devices 672a. It will be appreciated by one having ordinary skill in the art that there are many functions typically carried out by a mobile base station and mobile switching centers, any of which can be used and tested in accordance with the invention. Carrier 3 602 is, for example, a network-based contact center comprised of one or more signal switching points 613, one or more service control points 614, and one or more network interactive voice response units (IVR) IVR 615 (for example, IVRs capable of execute scripts in one of more scripting languages such as voice extensible markup language (VoiceXML), call control extensible markup language (CCXML), or some proprietary language. IVR scripts can carry out telephony operations such as outbound calls, answering calls, database access, and recognize speech of callers). It will be appreciated by one having ordinary skills in the art that there are many functions typical carried out by IVRs, any of which can be performed and tested in accordance with the invention. Carrier 3 602 serves one or more cloud network devices such as cloud network device 666, and cloud network device 667.

Referring again to FIG. 6, cloud network device 666 is, for example, a telephone operator position system, comprised of a toll switch with one or more subscriber lines such as 673a and 673b. It will be appreciated by one having ordinary skill in the art that there are many functions typically carried out by a telephone operator position system, any of which can be used and tested in accordance with the invention. Cloud network device 667 is, for example, a public telephone switch that provides telephone coverage and connections to the public network to one or more subscriber lines such as 673c and 673d. It will be appreciated by one having ordinary skill in the art that there are many functions typically carried out by a public telephone switch, any of which can be used and tested in accordance with the invention.

Internet 603 is, for example, a global packet switched IP-based network comprised of one or more IP routers, such as router 1 616, router 2, 618, and router 3 617, and serving one or more computing platforms, laptops, tablet devices or other internet devices such as PC 675a, and one or more voice over IP endpoints such as VoIP device 676a. It will be appreciated by one having ordinary skill in the art that there are many functions typically carried out by a packet switched IP-based network, any of which can be used and tested in accordance with the invention.

Referring again to FIG. 6, WAN 604 is, for example, a wide area network comprised of one or more routers, such as router 5 619 and router 6 620 serving one or more voice over IP devices such as VoIP device 676b. It will be appreciated by one having ordinary skill in the art that there are many functions typically carried out by a WAN, any of which can be used and tested in accordance with the invention.

Arbitrary network 605, serving one or more voice enabled devices such as voice device 673f, one or more mobile devices, for example a mobile device, tablet device, or other device 672a, one or more computing platforms, for example, a laptop, personal computer, or palm computing device such as PC 675a.

Customer service environment site 1 625 is, for example, a contact center comprised of one or more interactive voice response units (IVRs) such as IVR 1 621, one or more ACDs 626 that provide call distribution functionality to callers, one or more CTI servers 627 that provide technology that allow interactions on a telephone and a computer to be integrated or coordinated, one or more call routers 628 that provide routing of one or more callers to one or more agents, such as 631a and 631b, one or more databases DB 630, one or more customer relationship management servers CRM 629, one or more personal computer systems such as PC 632a and PC 632b for viewing customer information by agents such as 631a and 631b, and other contact center and business processing components not shown.

IP services 660 is, for example, an Internet protocol service function comprised of one or more media servers 662, one or more gateways 661, and one or more routers 663. Customer service environment site 2 640 is, for example, an IP-based contact center, comprised of one or more SIP servers 642 providing the functionality to create, modify and terminate two-party and multiparty sessions between callers and agents such as 643a and 643b one or more IVR 3 641, one or more personal computer systems such as PC 644a and PC 644b for viewing customer information by agents such as 644a and 644b. Customer service environment site 3 650 is, for example, an automatic call distributed-based contact center environment comprising of one or more automatic call distributors ACD 652 providing call distribution functionality for incoming calls to a group of terminals that agents use such as 654a and 654b, one or more CTI servers 653 that provides technology that allows interactions on a telephone and a computer to be integrated or coordinated, one or more IVR 2 651, one or more personal computer systems such as PC 655a and PC 655b for viewing customer information by agents such as 654a and 654b. Customer service environment site 3 SFDC 665 is, for example, a typical cloud based customer service environment such as that provided by salesforce.com.

TABLE 1

Example fault paths.

| | Communication Type | Communication Path | Fault Detected? | Fault |
|---|---|---|---|---|
| 1.1 | Voice | POTS telephone 673e calls customer service environment site 1 625. Switch 610 of carrier 1 600 identifies the location using switching techniques known in the art, and sends the call to IVR 1 621 for caller identification. The caller enters digits and ACD 626 queries CTI server 627 to determine where to send the call. The call is then sent to agent 631a. | No | Not applicable |
| 1.2 | SMS text message | Mobile device 672a sends a text message to customer service environment site 2 640. Mobile base station 611 received the text message and determines that it is to be sent to customer service environment site 2 640. Mobile switching center 612 forwards the text message to customer service environment site 2 640 and the text message is sent to the appropriate agent | No | Not applicable |
| 1.3 | VoIP call | VoIP phone 676a calls customer service environment site 2 640. Internet 603 routes the voice packets to IP services 660 from router 1 616 to gateway 661 and passed to agent 643a as directed by SIP server 642. | Yes | Degraded service. Packet loss and delay |
| 1.4 | VoIP call | VoIP phone 676b calls customer service environment site 2 640. WAN 604 routes the voice packets to IP services 660 from router 5 619 to gateway 661 and passed to agent 643b as directed by SIP server 642. | No | Not applicable |
| 1.5 | Mobile call | Mobile phone 672b calls customer service environment site 2 640. Arbitrary network 605 passes the call to gateway 661 then the call is passed call router 663 then to media server 662 and the call drops unexpectedly. | Yes | Lost call |
| 1.6 | Instant messaging session | PC 675b sends and instant message to SFDC 665. Arbitrary network 605 passes the instant message to SFDC 665 and communication between the two endpoints begins | No | Not applicable |

Table 1 outlines exemplary communication paths that may typically occur in a communication center environment (an example of a functionally complex system 470). The examples in Table 1 outline two communication paths that resulted in a fault. The first, row 1.3 of Table 1, is a VoIP call that resulted in degraded service and lost packets. The second fault was a dropped call on row 1.5 of Table 1. By understanding particular call paths where faults occur, whether fault detection was accomplished from a notification, from periodic testing, or some other means, testing system 400 can now take measures to identify one or more particular components definitely or possibly involved in a fault, identify one or more causes of a fault, and potentially repair detected faults automatically without human intervention.

In a preferred embodiment, testing system 400 would attempt to automatically recreate the call flow for which a fault was detected by using any data that was provided when the fault was reported. For example, if a fault occurred when testing the communication path outlined in row 1.3 of Table 1, testing system 400 may attempt to create a test call that follows the same path. If system 470 experiences the same fault, testing system 400 will attempt to initiate a similar communications test using a plurality of different components or combinations of components in order to isolate which component, or set of components, caused the fault. In this example, an additional test call is passed to router 2 618 (that is, instead of passing it to router 1 616) and the fault is not seen. The system creates an additional test call and passes it to router 3 617 (that is, instead of passing it to router 1 616) and again, no fault is detected. In this example, testing system 400 now has a high confidence that the fault is specific to router 1 616. Test analyzer 440 makes note of this fault in test data storage subsystem 425 and notifies functionally complex system 470 of the fault for corrective action to be taken by an operator or an owner of functionally complex system 470.

Referring again to Table 1, it is also noted that a fault was detected by the communication path denoted by row 1.5. In this example, a mobile call dropped before it reached its destination. When testing system recreates the call exactly, the fault is not detected. Testing system 400 then creates additional test calls using one or more of the other components within the communication path as well as the use of additional cloud environments, for example Internet 603. Testing system 400 is unable to recreate the error. Since testing system 400 was unable to reproduce the fault, test analyzer 440 makes note of this fault in test data storage subsystem 425 and reports that the issue is with media server 662 (i.e. the last component that the call used before it unexpectedly dropped) with a low confidence rating. Furthermore, test analyzer 440 creates a precursor event pattern to monitor any future faults that may involve media server 662. Finally, test analyzer 440 notifies functionally complex system 470 of the fault for corrective action to be taken by the operator or owner of functionally complex system 470.

Figure 7:
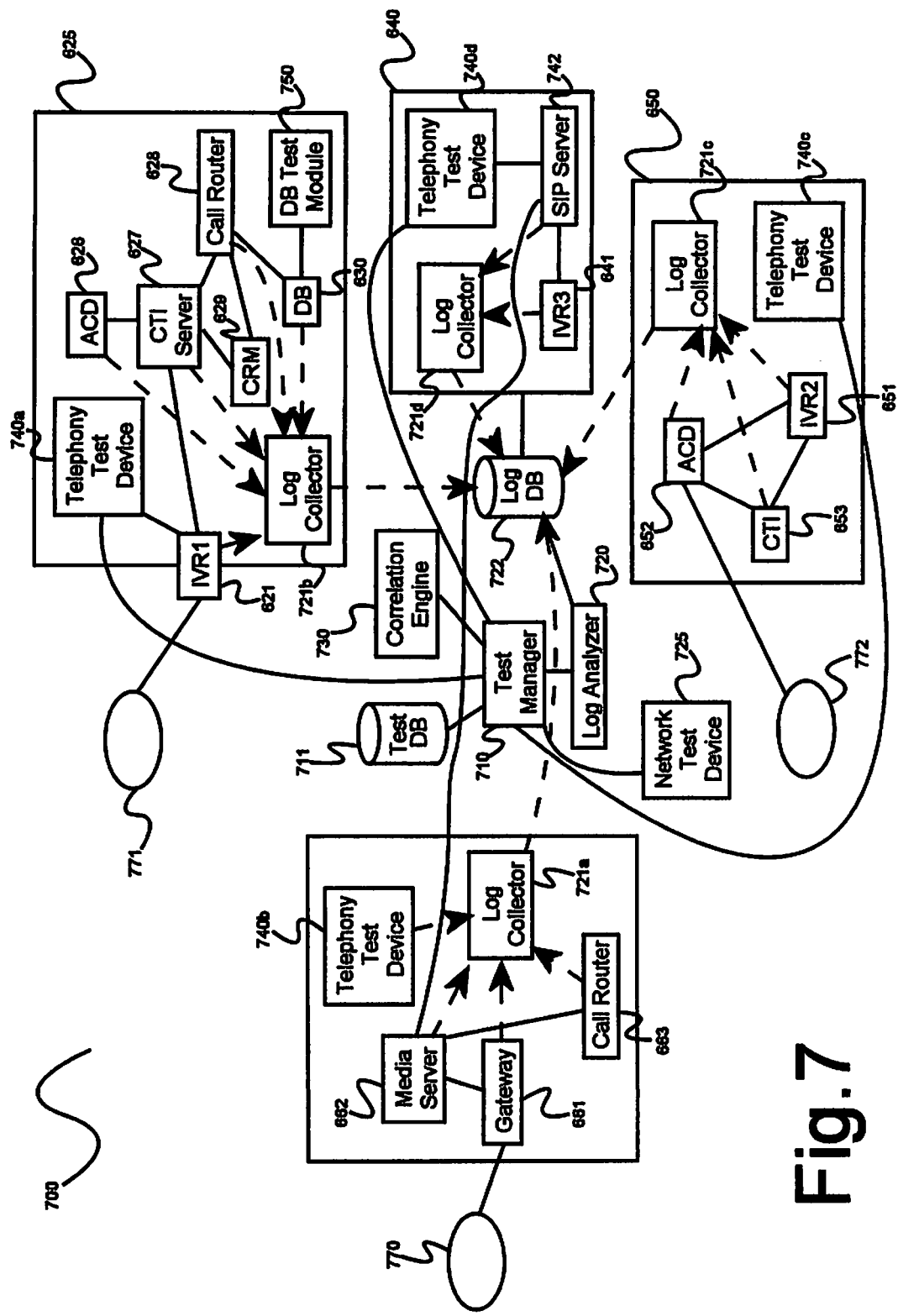
FIG. 7 is a detailed block diagram showing an exemplary arrangement of test components in a functionally complex system, according to an embodiment of the invention.

FIG. 7 is a detailed block diagram showing an exemplary arrangement of test components in a functionally complex system, according to an embodiment of the invention. In one embodiment, the core function of the test system is test manager 710 which is used to manage and direct other components (for example, telephony test device 740a, telephony test device 740b, telephony test device 740c, telephony test device 740d, log analyzer 720, and correlation engine 730) by emulating interactions within the communication environment to test and diagnose faults, or potential faults in complex environment 740. Furthermore, test manager 710 receives its configuration and test directives from test database 711 (for example, a persistent storage with configuration information, computations from previous testing, user-enter test directives, suspect components descriptions notified by neighboring systems, etc), to test hardware and software components of functionally complex system 470.

Referring again to FIG. 7, correlation engine 730 analyzes of a plurality or series of tests, log files, system events, testing results, and other occurrences from a plurality of functionally complex systems 470, which may help to identify relationships between different events and faults. For example a communication path testing series that involves the testing of various components, such as, investigating a fault with IP services 660, results in test manager 710 to initiate a series of interactions via telephony test device 740a to automatically offer test interactions to IP services 660 through data network 770 with the goal of identifying the communication paths that have had a successful outcome in testing, and thus discarding them for uncovering faults. Test interactions of a similar fashion, would continue to be passed through functionally complex system 470 until one or more faulty communication paths are identified. If, for example, the fault ended up being a faulty component gateway 661, correlation engine 730 would attempt to find a relationship to other events that may have occurred within the system within a given timeframe, on the same component, or some other logical relationship, for example an entry in a log files that that showed peculiar behavior of a related component was detected by log analyzer 720. In this example, the gateway log entries may have shown uncharacteristically long response times when processing IP communication packets. Correlation engine 730 would create a relationship between a long response time for a gateway and gateway performance. Furthermore, the log file event that indicated the uncharacteristically long response time when processing an IP communication packet, would be considered a precursor event.

In a preferred embodiment, a plurality of functionally complex systems 470 each registers their components and architecture to component and architecture registration 445. When a fault is found in one functionally complex system 470, correlation engine 730 will determine what other functionally complex systems 470 may have a similar component and/or architecture. In this case, correlation engine 470 will use information gathered from the test results from the first functionally complex system 470 and proactively apply the same process for discovering faults, and formulate attempt to automatically resolve the issues for the other functionally complex systems 470. For example, for a functionally complex system that has a customer service environment site 3 650 and a fault is detected when, for example, interactions that go through a particular path in IVR 2 651 coupled with a request for distribution functionality from ACD 652, and a subsequent resolution is found through testing, as described previously, correlation engine 730 may proactively perform testing for other functionally complex systems 470 that also contain a similar customer service environment site 3 650. Furthermore correlation engine 730 can use quantitative and time-based characteristics, such as, input/output rates for various hardware and software, to identify potential fault relationships from when a fault occurs, to when different informational sources notify of certain events. For example, by analyzing data retrieved from log data 722, such as time-coded log information from all the devices within complex system 470 that generate logs in a functionally complex system 470 to identify if other events or other information, correlation engine 730 may provide an indication as to why a fault occurred, a reason a fault occurred, and/or steps that may be taken to prevent a future occurrence of the fault.

Referring again to FIG. 7, log analyzer 720 analyzes events within log files that are stored in log database log DB 722 that are collected by log collector 721a, log collector 721b, log collector 721c, and log collector 721d, that were generated by components (for example, IVR1 621, ACD 626, CTI 627, CRM 629, call router 628, DB 630, IVR3 641, SIP server 742, ACD 652, CTI 653, IVR 651, media server 662, gateway 661, call router 663, and other components) having a logging function, in an attempt to collect events that could have a correlation to a fault (for example, if a system server ceases to function, and log analyzer 720 noted that 30 minutes prior to the fault, a hard disk drive of the server was reaching capacity), log analyzer 720 would identify and pass it to test manager 710, who would then pass it to correlation engine 730 for further processing, categorization, and/or other action. In some embodiments, correlation engine 730 and log analyzer 720 may be combined in one analysis component, or various of their respective features may be distributed in other ways among test manager 710, correlation engine 730, and log analyze 720, or even other components. It will be recognized by one having ordinary skill in the art that specific allocations of functions described regarding analysis of test and log results may vary from embodiment to embodiment without departing from the intended scope of the invention.

Network test device 725 is a network test component controlled by test manager 710 that can test various network devices and various infrastructures (for example, domain controllers, routing errors, firewalls, wireless connectivity, etc.) used in functionally complex system 470. Examples of test procedures that may be used or initiated by network test device 725 may include, but are not limited to, such network-oriented test procedures as ping testing, port mapping, packet inspection, dropped packet detection, and so forth. It will be appreciated by one having ordinary skill in the art that there are many network-oriented testing techniques known in the art, any combination of which may be used, coordinated, or initiated by one or more network test devices 725 without departing from the scope of the invention.

Customer service environment site 1 625 is comprised of several components, as described earlier, such as ACD 626, CTI Server 627, Call Router 628, CRM 629, IVR 1 621, DB 630, and telephony test device 740a that can be used as a test device to initiate an interaction to test the system. In this example, telephony test device 740a could be a telephony device that is controllable by a script as directed by test manager 710. Test manager 710 can send a command to telephony test device 740a to initiate telephony sessions through IVR 1 621 that goes through PSTN 1 771 to create interactions that arrives on data network 770 to test the components of IP services 660, such as gateway 661 (for example verify the stability of the hardware link and the network driver), media server 662 (for example, measuring voice file delay), call router 663 (for example, if the interaction arrives at the proper destination), etc.

In another embodiment, test manager 710 can send a command to telephony test device 740c to initiate telephony outbound interaction through IVR 2 651 that is delivered through PSTN 2 772 to create an interaction that arrives on data network 770 to test the components of customer service environment site 2 640, for example, IVR 3 641, (for example, by traversing an IVR tree), and SIP Server 742 (for example, by testing signaling logic and server connectivity by reviewing and comparing telephony events).

In another example, test manager 710 can send a command to telephony test device 740a to initiate an outbound telephony interaction through IVR 1 621 that goes through PSTN 1 771 to create an interaction that arrives on PSTN 2 772 to test the components of customer service environment site 3 650, for example, ACD 652 (for example, queue configuration and database access points), CTI 653 (for example, verify server integration and network lag), IVR 2 651 (for example, by traversing an IVR tree using speech recognition), etc.

Figure 8:
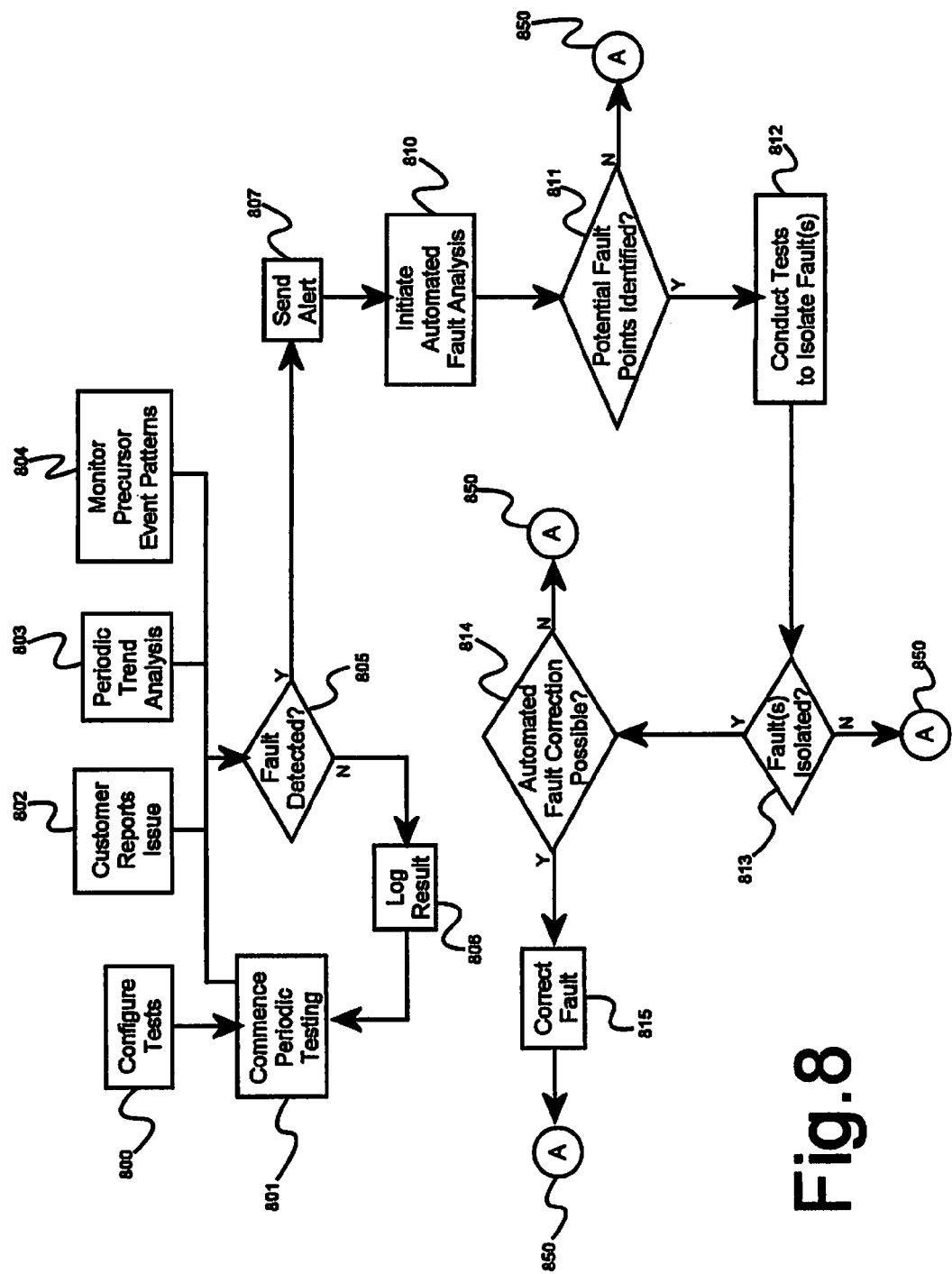
FIG. 8 is a process flow diagram illustrating a method of testing functionally complex systems, according to a preferred embodiment of the invention.

FIG. 8 is a process flow diagram depicting an exemplary fault detection process. In a first step, test configuration interface 800 retrieves one or more testing rules from a pre-defined configuration from testing system 400 in a complex system testing environment. Testing configuration can include, but is not limited to testing of a plurality of specific components, testing using typical process flows specific to complex system 470, general system testing based on other configurations, or executing more involved testing processes encompassing a larger number of components (or even a full system test) in testing of complex system 470. Once a configuration is retrieved, periodic testing function 801 begins to periodically test functionally complex system 470 based on the retrieved configuration. Periodic testing for functionally complex system 470 can include testing based on a predefined schedule addressing predefined components and/or subsystems based on a schedule, triggered by an event, or by some other means. For example, periodic test can perform a load test when the system is in a low traffic period. In this case, when a low traffic period is detected, periodic testing will commence by test manager 710 sending a request to telephony test device 740*a* to initiate a high number of interactions from IVR 1 621 through PSTN 1 771 to PSTN 2 772 to test all components of customer service environment site 3 650 through a predefined call flow. In another example, periodic testing may commence during peak traffic hours in an effort to measure how, for example, a specific component of a functionally complex system 470 responds while under load. In this example, test manager 710 sends a request to telephony test device 740*c* to initiate an interaction from IVR 2 651 through PSTN 2 772 to data network 770 to test the voice response of voice files used by media server 662 of IP services 660. In another example, periodic testing can include traversing IVR trees, testing drop call scenarios, measuring network response times, testing for packet loss, and other functions and processes of functionally complex system 470. In addition to periodic testing function 801 performing periodic testing of complex system 470, notification of issues can come from users of functionally complex system 470 through notification in step customer reports issue 802, (for example, verbally through a telephone conversation, or through automatic means such as, but not limited to, using DTMF or speech recognition via an interactive voice response unit or using automatically generated alerts sent via a packet data network). In addition, notification can come from step 803 periodic trend analysis is monitored for fault detection. Precursor events are, for example, events that through correlation engine 523 are identifying as having a relationship to a potential fault that may have occurred in functionally complex system 470. For example, if from a previous system test, log analyzer 720 reported that there was a log event with notification that the hard disk drive used to store call routing information for call router 663 was reaching capacity (herein, referred to a "the precursor event"), shortly before a fault occurred in call router 663, correlation engine 523 may have determined that this log event was related to call router 663 failing to execute (i.e. a fault that was detected after the log event). In this case, the precursor event would defined as the log event indicating that when hard disk capacity reaches maximum levels for call router 663, it could potentially produce a fault in call router 663. In step 804, precursor event patterns captured in previous fault detection testing processes, for example a full hard disk drive mentioned previously, an event that similar conditions may produce a fault in call router 663 of functionally complex system 470 will be triggered. If no fault is detected then the periodic testing function continues in step 801 and the process begins again. When there is a notification of a fault by 805, from one of the sources mentioned above, system 400 may optionally send an alert 807 to testing system 400. If this is the case, an automated fault analysis process is initiated in step 810 to analyze the fault. If a cause of the fault is not identified in step 811, the process continues in step 850 for post-incident fault processing. If a fault is identified then further tests will be conducted in step 812, for example, system 400 begins to test one or more components involved in the fault with various combinations of testing techniques (that is, including some of the components, or bypassing some of the components, in a testing process flow to attempt to isolate which component is implicated in fault creation when testing various permutations and combinations of components). If a fault is isolated in step 813, testing system 400 attempts to automatically correct the fault, otherwise, if the fault is not isolated, the process continues in step 850 for post-incident fault processing. In step 814, if fault correction is possible (for example, restarting one or more component, changing one or more component configurations, bypassing one or more components, passing control to one or more backup components, or some other corrective measure that bypasses or minimizes the effect of the fault), then the fault is automatically corrected and functionally complex system 470 is notified including information any information available on all associated parameters (e.g. an identity of a detected fault, a plurality of components involved in the fault, any corrective actions that were taken, and any other information with respect to the fault). If a fault cannot be automatically corrected, the process continues in step 850 for post-incident fault processing. If a fault can be automatically corrected, then the fault is corrected in step 815 and the process continues in step 850 for post-incident fault processing.

In some embodiments of the invention, if a precursor event pattern is identified, one or more of the test manager, event collector, log collector, and test analyzer modules may be configured to proactively identify similar precursor event patterns in the future, as described above. Moreover, in some embodiments, when such a precursor event pattern is identified, automatic corrective action may be taken by system 470 or test system 400 to avoid a potential fault. For example, if a call routing failure was associated, after post-failure analysis, with a pattern of precursor events (and particularly if the pattern is determined to have been a cause of previous failures or degraded operational performance measurements), then for example log collection server 410 or event collection server 420 might be configured to monitor one or more event streams (note that logs often transmit event-based data, the distinction between a log collection server 410 and an event collection server 420 typically being that the former extracts event data from log files written shortly after an event occurred, whereas the latter extracts events more or less in real time directly from an interface on or associated with one of components 471-475), for occurrences of the same or a similar precursor event pattern; on detecting such a precursor event pattern, that fact may be transmitted to test manager 430 or to an affected component 471-475, and in response an action might be taken automatically such as switching to a backup router and then restarting the router that showed the precursor event pattern. In this way, in some embodiments test system 400 actually improves operations proactively by identifying impending faults before they occur, and automatically taking action to prevent their occurrence.

Figure 9:
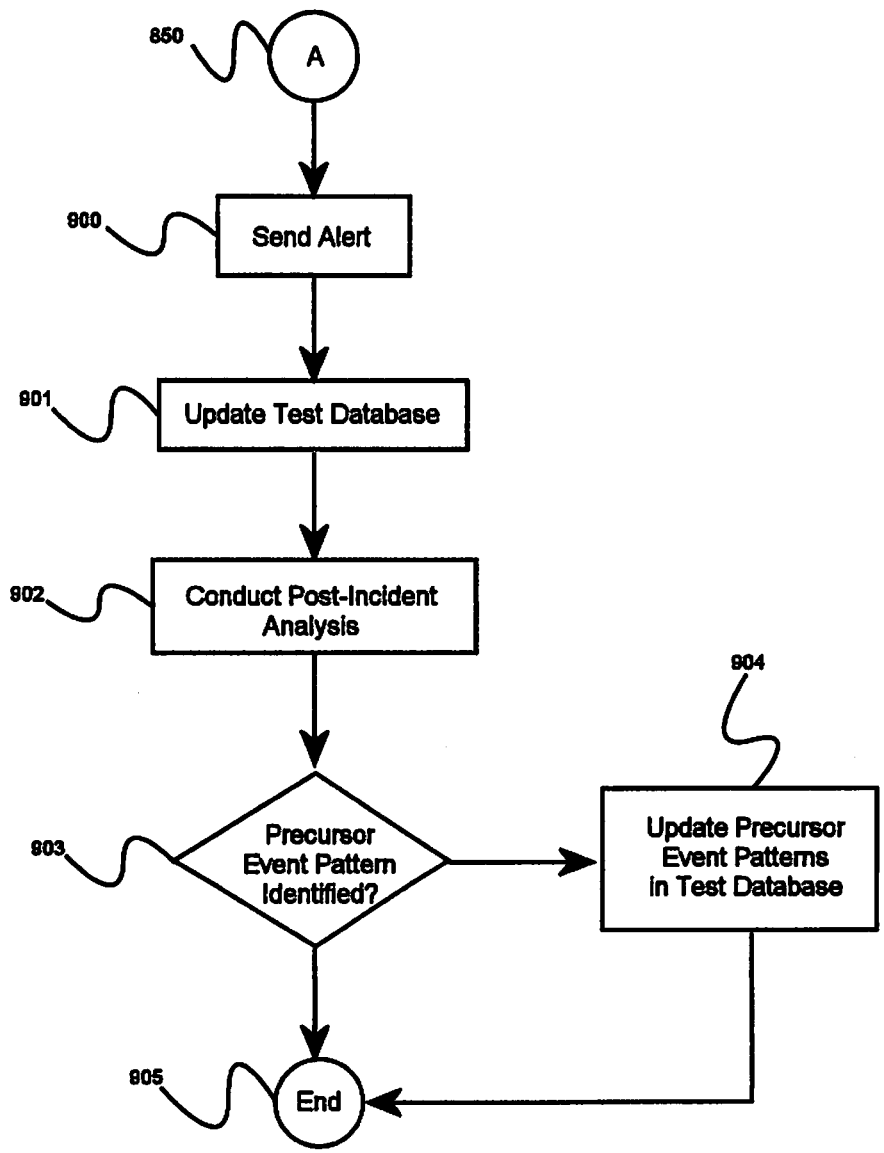
FIG. 9 is a process flow diagram illustrating a method for automated defect analysis, according to an embodiment of the invention.

FIG. 9 is a process flow for post-incident fault processing. In step 850, a notification with associated data is received from various steps as described in FIG. 8. In step 900, an alert that a fault has occurred in functionally complex system 470 is sent to an operator or owner of functionally complex system 470 with details of the fault (for example, the fault identifier, the fault description, the components that were in-use while the fault occurred, the corrective actions that were attempted, any outcomes from actions taken by system 400, or any other information with respect to the fault). In a next step 901, a test database in test data storage subsystem 425 is updated with that information and any associated information available for the fault. In step 902, system 400 conducts post-incident analysis to attempt understand the nature of the fault, any actions that were taken, what testing system 400 was able to do in terms of resolving the fault, any correlation of the fault to any other events that could be associated with the fault (for example, information in a log file that could act as a predictive indicator to a similar fault in the future, other faults that occurred within a specified timeframe on the same component or other components that could be associated with the fault, fault trends, or other information that system 400 deems relevant to the fault). If a precursor event pattern is identified in step 903, then test data storage subsystem 425 is updated with the precursor event pattern in test system 400. The post-incident fault-processing step then ends in step 905.

Figure 10:
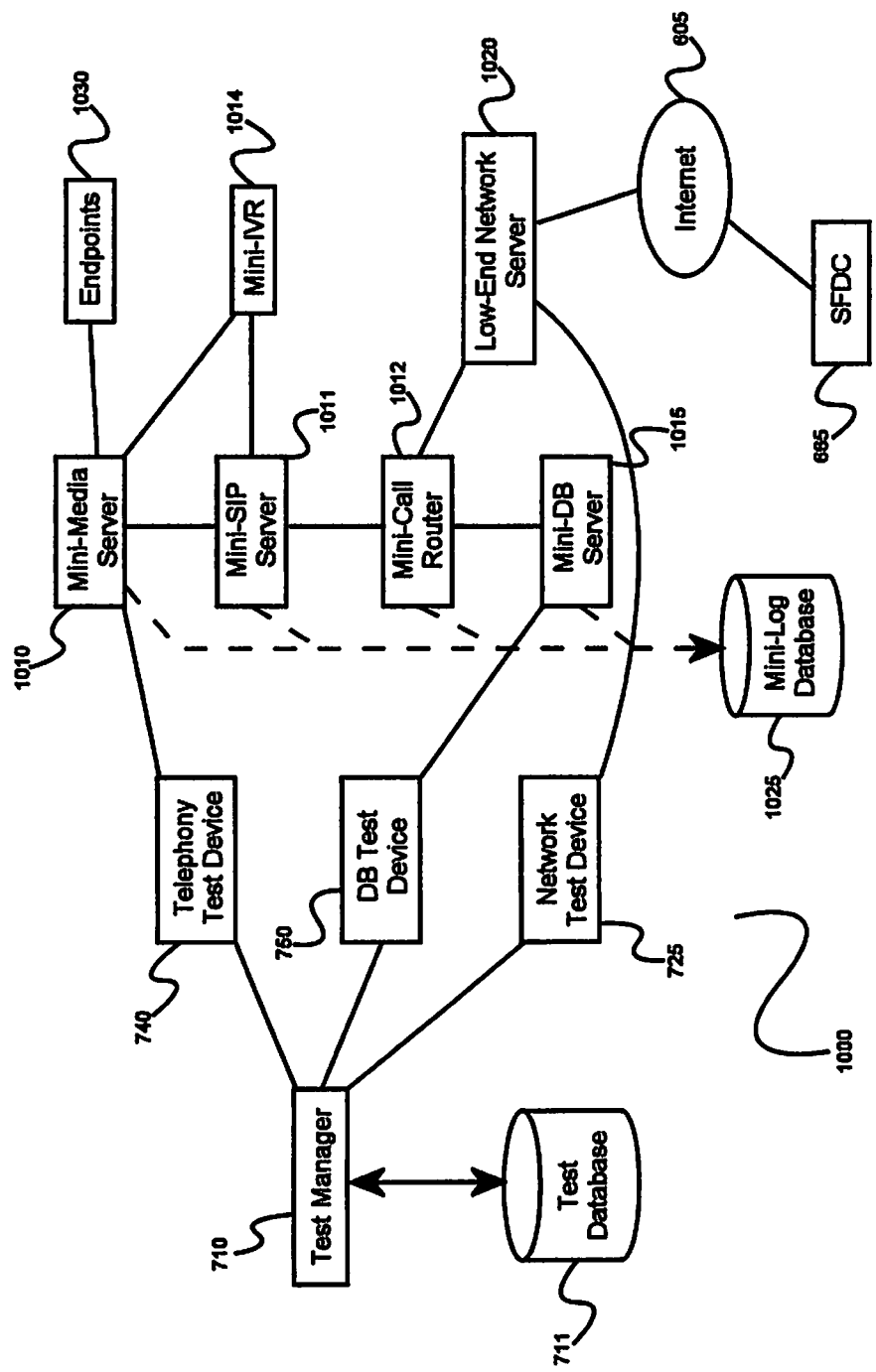
FIG. 10 is a block diagram of a system for detecting intermittent or load-related defects in a functionally complex system, according to an embodiment of the invention.

FIG. 10 is a block diagram showing details of a testing system 1000 adapted to conduct reduced capacity testing to more efficiently identify and isolate possible load-dependent or intermittent faults, according to a preferred embodiment of the invention. According to the embodiment, system 1000 is made up of physically resource-constrained servers 1010-1015 (referred to as "mini-servers"), which are typical servers found in functionally complex system 470 but that are configured with much smaller resources than are used in functionally complex system 470 itself (for example, such servers may have reduced hardware capacity well below specifications that are used in system 470). For example, mini-log database 1025 may be a typical database system typically found in functionally complex system 470, but running on a physical machine with significantly reduced capacity, such as by having limited memory, hard drive space, or processors). Similarly, mini-IVR 1014 may be an IVR system typical of those found in functionally complex system 470, but with a reduced port capacity or some other specification below a typical IVR as specified by the manufacturer; or low-end network server 1020 may be for example a network router which is of lower capacity than typically required for functionally complex system 470. Mini-media server 1010 may be running on a computing platform such as a personal computer whose processor is of lower speed capacity than required by system specifications as identified by the owner or operator of functionally complex system 470. In another example, mini-SIP server 1011 may be running on a computing platform such as a personal computer where the random access memory (RAM) is not up to the system specifications as required in a typical system such as functionally complex system 470. In another example, mini-log database 1025 has not read/write cache process configured which would reduce the performance and would be up to specification for a system such as functionally complex system 470. In another example, a mini-IVR 1014 that is running with a lower number of ports than typically required for a system such as functionally complex system 470. In another example, low-end network server 1020 is a server that was not optimized for the requirements typical in a system such as functionally complex system 470.

Referring again to FIG. 10, when test manager 710 begins testing, it receives its configuration and testing instructions from test database 711 and testing begins. In one example, test manager 710 sends an instruction to telephony test device 740 to test mini-media server 1010 and mini-SIP server 1011 in a similar fashion known in the art (and indeed typically in a manner similar to that described above with respect to testing of functionally complex system 470). It will be appreciated by someone knowledgeable in the art, that many testing scenarios for a complex system can be used to test mini-media server 1010 and mini-SIP server 1011. While testing mini-media server 1010 and mini-SIP server 1011, a person or process that is conducting testing may increase one or more load-related parameters of various test cases, such as by increasing the speed at which test interactions are sent to mini-media server 1010 and mini-SIP server 1011, and may then review any impact on system 1000. In turn, mini-media server 1010 and mini-SIP server 1011 will use other components such as, mini-call router 1012, mini-DB server 1015, so the testing will affect these components as well. Furthermore, testing may include terminating calls at mini-IVR 1014 or at endpoints 1030 will include those components in testing as well. In addition, when testing mini-servers 1010-1015, mini-log database 1025 will be accessed and, in turn, tested as well. In another example, test manager 710 can instruct DB test device 750 to test mini-DB server 1015 which accesses mini-log database 1025, so in effect, testing mini-log database 1025. In another example test manager 710 instructs network test device 725 to test low-end network server 1020 by sending interactions through the internet 605 to SFDC 665. In all the scenarios mentioned here, test manager 710 creates test scenarios and conducts tests as if the physical specifications of the environment were typical of those used in functionally complex system 470. By using servers that are not up to specifications (for example, mini server 1010-1015, mini-log database 1025, mini-IVR 1014, low end network server 1020, or any other server in system 1000 where a reduced specification scenario is substituted for testing), issues that might normally take some time to become detectable (for example, as peak capacity reaches system limits) would happen sooner and in a more predictable fashion. This provides an enhanced test capability when testing complex systems 470 over systems known in the art.

According to some embodiments of the invention, testing of functionally complex systems 700 may be conducted using reduced capacity components (that is, using an arrangement such as that illustrated in FIG. 10), to perform more fruitful load testing prior to placing a newly-implemented (or upgraded) system into production. According to these embodiments, use of components such as "miniature call router" 1012, "miniature database server" 1015), "miniature SIP server" 1011, and so forth, allows testing personnel to probe a system's likely long-term performance before it is put into production. For example, it is not uncommon for complex server systems to fail for unexpected reasons such as a hard disk drive's becoming full (often this occurs because logging systems fill up the hard disk drive, causing the system to crash). Using scaled-down versions of servers may make it possible to detect such problems during pre-production testing, whereas in normal testing environments such incipient problems would not normally be detectable (since testing is conducted on a "new" environment, and since testing periods are often short in duration).

Another common problem addressed by various embodiments of the invention is the challenge of conducting thorough-enough load testing prior to placing a functionally complex system 700 into production. During most load testing performed in the art, a small number of fixed test scenarios are executed at a high rate of repetition in order to place various components of system 700 under load comparable to that which might occur in peak conditions during production operations. But use of a few static test cases at load, while it may enable detection of upper performance limits of isolated components such as various servers used in system 700, complex faults that may be load-dependent will generally not be detected. This is because, while the system is tested under heavy load, it is generally not tested under load while executing a full range of functionally complex operations. In fact, a common reason for failures of complex systems 700 in operation, despite extensive pre-production testing, has been that such testing rarely exercises such systems 700 in ways that mirror what occurs in production. On the other hand, various embodiments of the present invention enable a full range of complex system testing to be conducted, including functionally complex load testing, at varying degrees of load up to and including full peak load, all prior to commencement of production operations. In some embodiments, a test system 1000 that uses reduced-capacity components is used to conduct such functionally complex load testing prior to placing a "real" system into production. Because such a system 1000 has a full end-to-end system configuration, including telephonic endpoints, and because it uses external components common to production systems, such as long-distance carrier networks and the Internet, test manager 710 will in general be able to conduct tests that mimic a wide range of actual or anticipated behaviors, rather than simply hammering one or two components at a time using repetitive, static test cases (which is the nature of most load testing carried out in the art today, as will be appreciated by one having ordinary skill in the art).

In general, not all "miniaturized" components (such as servers 1010-1015) need to be reduced in all aspects, according to the invention. Rather, according to some embodiments, various alternatives are contemplated. In one embodiment, one or more servers 1010-1015 are equipped with limited memory and hard disk drive capacity, but are provided with the same complement of processors as those planned for corresponding production servers. Such a configuration is beneficial in that it allows one to isolate disk, memory, or input/output scalability issues quickly (for example, memory leaks, disk drive exhaustion, or I/O congestion), while ensuring that processors used are fast enough (or plentiful enough) to deliver a full peak load level comparable to what is anticipated to occur in production. In another embodiment, an otherwise normal database server might be equipped with an underpowered network interface card, in order to test for network-related load issues prior to production. In some embodiments, a variety of servers may be used for a single component, depending in each case on the requirements of a particular test case. That is, there may be a plurality of miniature router servers 1012, some of which are undersized in processor capacity, some in network capacity, some in memory or disk capacity, and some others in various combinations of these. Test manager 710 may select one or another of these variant hardware configurations for particular test cases in order to fully exercise system 700 at load, while carrying out functionally complex operations comparable to what is expected to occur in production, all prior to placing system 700 into production.

In some embodiments, functionally complex testing is driven at least in part by historical performance of one or more components of system 700, or of system 700 as a whole. That is, historical performance data stored in test database 711, in log database 722, or in another data repository, may be used to determine statistical characteristics of one or more components' performance in production at load, and these statistical characteristics may be used by test manager 710 to ensure that sufficiently complex operations are used during testing to surface potential load-related problems before they occur.

Moreover, when system 1000 is used for testing in parallel to a system's 700 use in production, historical data about the production use may be imported into system 1000 to ensure that system 1000 behaves, as a system and at various component levels, similarly to how the production system behaves.

In some embodiments of the invention, system 1000 may make use of one or more virtual machines. For example, a variety of virtual machines, each with a designated configuration, may be deployed on a single general purpose server machine, some serving as call routing servers, some as SIP servers, and so forth. These virtual machines may be used, directly or indirectly under control of test scripts run or managed by test manager 710, to conduct multiple tests, either under load or not, in parallel. Moreover, by varying for example memory configurations among a series of virtual machines, load-dependent conditions such as memory leaks may readily be detected. While use of a virtualized test environment will be appreciated by those having ordinary skill in the art as providing an enhanced ability to rapidly configure and conduct flexible testing strategies, it may also be beneficial, according to the invention, to arrange testing system 700 in a highly-virtualized way when the system whose behavior is to be tested or studied is itself highly virtualized. In general, it will be appreciated by one having ordinary skill in the art that any combination of virtual or real machines may be used, according to the invention, to carry out functionally complex testing, both before and after a target system enters production, whether at load or not. Moreover, use of flexible arrangements of real and virtual machines will be understood to be quite beneficial when conducting automated fault isolation and root cause analyses under control of test manager 710 and using correlation engine 730.

The skilled person will be aware of a range of possible modifications of the various embodiments described above. Accordingly, the present invention is defined by the claims and their equivalents.

What is claimed is:

1. A system for automated testing of functionally complex systems, comprising:
    a test manager module operating on a server computer and adapted for managing testing of a distributed functionally complex system comprising functional electronic components of at least two functional types connected across a network and a plurality of networking connectivity components;
    a test data storage subsystem coupled to the test manager module and adapted to store at least test results;
    a log collection module operating on a server computer and adapted to receive log data from a plurality of log collectors;
    an event collection module operating on a server computer and adapted to receive event data from a plurality of event collectors;
    a test execution module operating on a server computer; and
    a correlation engine software module operating on a server computer and adapted to perform at least a mathematical correlation analysis of a plurality of test or operating data obtained from one or more of the test execution module, the log collection module, and the event collection module;
    wherein the test manager module causes tests to be executed by the test execution engine, the tests directed to actively testing the functionally complex system for faults;
    further wherein, on detection of an anomalous test result, the test manager causes the correlation engine to analyze data from the log collection module and the event collection module to attempt to positively identify a root cause of the anomalous test result;

further wherein, when the correlation engine is unable to positively identify a root cause of the anomalous test result, the correlation engine determines at least a plurality of additional tests that will assist the correlation engine in improving correlation results, and the correlation engine causes the test manager to cause the plurality of additional tests to be performed and the results thereof to be sent to the correlation engine in order to enable the correlation engine to positively identify a root cause of the anomalous test result; and wherein the test manager module causes tests to be executed by the test execution engine prior to the functionally complex system being placed into production in order to detect complex failure modes prior to placing the functionally complex system into production.

2. The system of claim 1 wherein, on detection of an anomalous test result, the test manager module at least causes additional testing to be performed and causes the test analysis module to analyze the results of at least some of the additional testing in order to isolate at least one component exhibiting anomalous behavior.

3. The system of claim 1, wherein the system is operated as a cloud-based service that provides automated pre-production testing to a plurality of operators of functionally complex systems located substantially remotely from the cloud-based service.

4. The system of claim 2, wherein the system is operated as a cloud-based service that provides automated testing to a plurality of operators of functionally complex systems located substantially remotely from the cloud-based service.

5. A method for automated testing of functionally complex systems, the method comprising the steps of:
- (a) actively testing, under direction of a test manager module operating on a server computer and adapted for managing testing of a distributed functionally complex system, a plurality of components of a functionally complex system comprising functional electronic components of at least two functional types connected across a network and a plurality of networking connectivity components, prior to placing the functionally complex system into production;
- (b) logging results of periodic testing and storing the results in a test data storage subsystem;
- (c) upon detection of a fault, sending an alert based on the detected fault;
- (d) upon detection of a fault, causing a correlation engine software module operating on a server computer to perform at least a mathematical correlation analysis of a plurality of the results to attempt to positively identify a root cause of the anomalous test result; and
- (e) when the correlation engine is unable to positively identify a root cause of the anomalous test result, determining at least a plurality of additional tests that will assist the correlation engine in improving correlation results;
- (f) causing the plurality of additional tests to be performed and the results thereof to be sent to the correlation engine in order to enable the correlation engine to positively identify a root cause of the anomalous test result; and
- (g) if one or more components responsible for the fault are identified, sending an alert at least identifying the identified components;

wherein the test manager module causes tests to be executed by the test execution engine prior to the functionally complex system being placed into production in order to detect complex failure modes prior to placing the functionally complex system into production.

6. The method of claim 5, wherein steps (a) through (c) are carried out using a cloud-based testing platform, and wherein the functionally complex system to be tested is operated by an entity different from the entity that operates the cloud-based testing platform, and is located remotely from the cloud-based testing platform.

7. The method of claim 6, wherein periodically testing a plurality of components comprises the substeps of:
- (a1) obtaining or creating a synthetic transaction comprising at least an address of a specific terminal device;
- (a2) generating an outbound call using a public telephony network based on the synthetic transaction;
- (a3) answering the outbound call at the specific terminal device; and
- (a4) measuring at least a quality metric pertaining to the completed outbound call to the specific terminal device.

* * * * *